United States Patent
Grayson

(10) Patent No.: US 6,960,989 B1
(45) Date of Patent: Nov. 1, 2005

(54) DETECTABLE WARNING SYSTEM

(76) Inventor: Thomas Grayson, 510 N. Hampton St., Anaheim, CA (US) 92801-5006

( * ) Notice: Subject to any disclaimer, the term of this patent is extended or adjusted under 35 U.S.C. 154(b) by 62 days.

(21) Appl. No.: 10/716,155

(22) Filed: Nov. 18, 2003

(51) Int. Cl.[7] .................................................. H04B 3/36
(52) U.S. Cl. ................ 340/407.1; 340/907; 340/691.1; 404/18
(58) Field of Search .............................. 340/407.1, 907, 340/691.1, 825.19; 404/18, 27–30, 34–36

(56) References Cited

U.S. PATENT DOCUMENTS 5,835,271 A * 11/1998 Stump et al. ................ 359/529

OTHER PUBLICATIONS

TOPMARK Brochure Estimated Late 2003.
TOPMARK Material Safety Data Sheet May 8, 2003.
TOPMARK Installation Instructions Jun. 3, 2003.
TOPMARK Detectable Warning Specification Jul. 23, 2003.

* cited by examiner

Primary Examiner—Daryl C Pope
(74) Attorney, Agent, or Firm—Goldstein Law Offices P.C.

(57) ABSTRACT

A detectable warning system, for tactilely signaling the presence of a terrain transition to a pedestrian, using a plurality of detectable warning domes that are arranged in a grid within a detectable warning carrier assembly. The detectable warning carrier assembly comprises a top layer and base layer of thermoplastic material with heat resistant detectable warning domes therebetween. The base layer is heated and adhered to a pavement surface. The detectable warning domes protrude from the pavement surface in an evenly spaced pattern that is detectable by the pedestrian using a cane or other guidance instrument.

6 Claims, 4 Drawing Sheets

DETECTABLE WARNING SYSTEM

BACKGROUND OF THE INVENTION

The invention relates to a detectable warning system. More particularly, the invention relates to a system for easily and effectively applying prefabricated detectable warnings to pavement to provide a tactile warning to pedestrians regarding a hazardous transition.

It is well known that persons with little or no usable vision depend upon environmental cues—ambient sounds, edges and other physical elements that can be sensed by a cane, and texture changes underfoot—for safe and independent travel. People with low vision can also use color contrast as a navigation aid. When raised curbs do not mark and separate the pedestrian route on a sidewalk from the vehicular way, as at curb ramps, vehicle drop-offs, or depressed corners at intersections, it is difficult for some pedestrians to discern the boundary between pedestrian safety and hazard.

Because of the inherent danger caused by transitions without textural changes, the Americans with Disabilities Act Accessibility Guidelines (ADAAG) requires that detectable warnings be installed onto pavement or ground surfaces at certain hazardous junctures. The detectable warnings provide a contrasting texture that signals a hazardous condition to the pedestrian, and thereby informs the pedestrian to exercise care. In particular, the current regulation requires that the detectable warning consist of truncated domes having a nominal diameter of 0.9 inches, protruding from the ground surface to a height of 0.2 inches, and having a center-to-center spacing of 2.35 inches. In addition, the warning should be of contrasting color to effectively warn those who have greatly reduced vision.

In many cases, the warnings must be retrofitted onto existing ground surfaces. Further, the installation of such warnings is not readily compatible with standard paving techniques. Accordingly, the detectable warnings are most typically installed onto already existing pavement surfaces.

Some have proposed systems for the creation and installation of the domes. Generally these systems involve the use of templates to create the dome "in place". Others have proposed systems of prefabricated warning domes. For example, TOPMARK proposes a system of preformed thermoplastic detectable warnings that is installed in sheets that have a plurality of thermoplastic domes. Unfortunately, the use of thermoplastic warning domes makes the system extremely difficult to install, since heat must be used to install the sheets, but heat will deform or destroy the thermoplastic domes.

While these units may be suitable for the particular purpose employed, or for general use, they would not be as suitable for the purposes of the present invention as disclosed hereafter.

SUMMARY OF THE INVENTION

It is an object of the invention to provide a system for allowing the effective installation of detectable warnings upon a pavement surface. Accordingly, the detectable warnings are made of a heat resistant casting material that is "sandwiched" between two layers of thermoplastic. The thermoplastic allows the warnings to be effectively mounted and evenly distributed on the pavement surface.

It is another object of the invention to provide a system for allowing the easy fabrication of detectable warning domes carriers for quick and easy subsequent installation of a plurality of domes simultaneously. Accordingly, a mold is used to initially create a top layer of thermoplastic material, create the detectable warning domes thereupon, and then create a base layer that sandwiches the detectable warning domes between said base layer and the top layer. Upon removal from the mold, the detectable warning dome carriers may be easily adhered to pavement surfaces by the application of heat.

The invention is a detectable warning system, for tactily signaling the presence of a terrain transition to a pedestrian, using a plurality of detectable warning domes that are arranged in a grid within a detectable warning carrier assembly. The detectable warning carrier assembly comprises a top layer and base layer of thermoplastic material with heat resistant detectable warning domes therebetween. The base layer is heated and adhered to a pavement surface. The detectable warning domes protrude from the pavement surface in an evenly spaced pattern that is detectable by the pedestrian using a cane or other guidance instrument.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
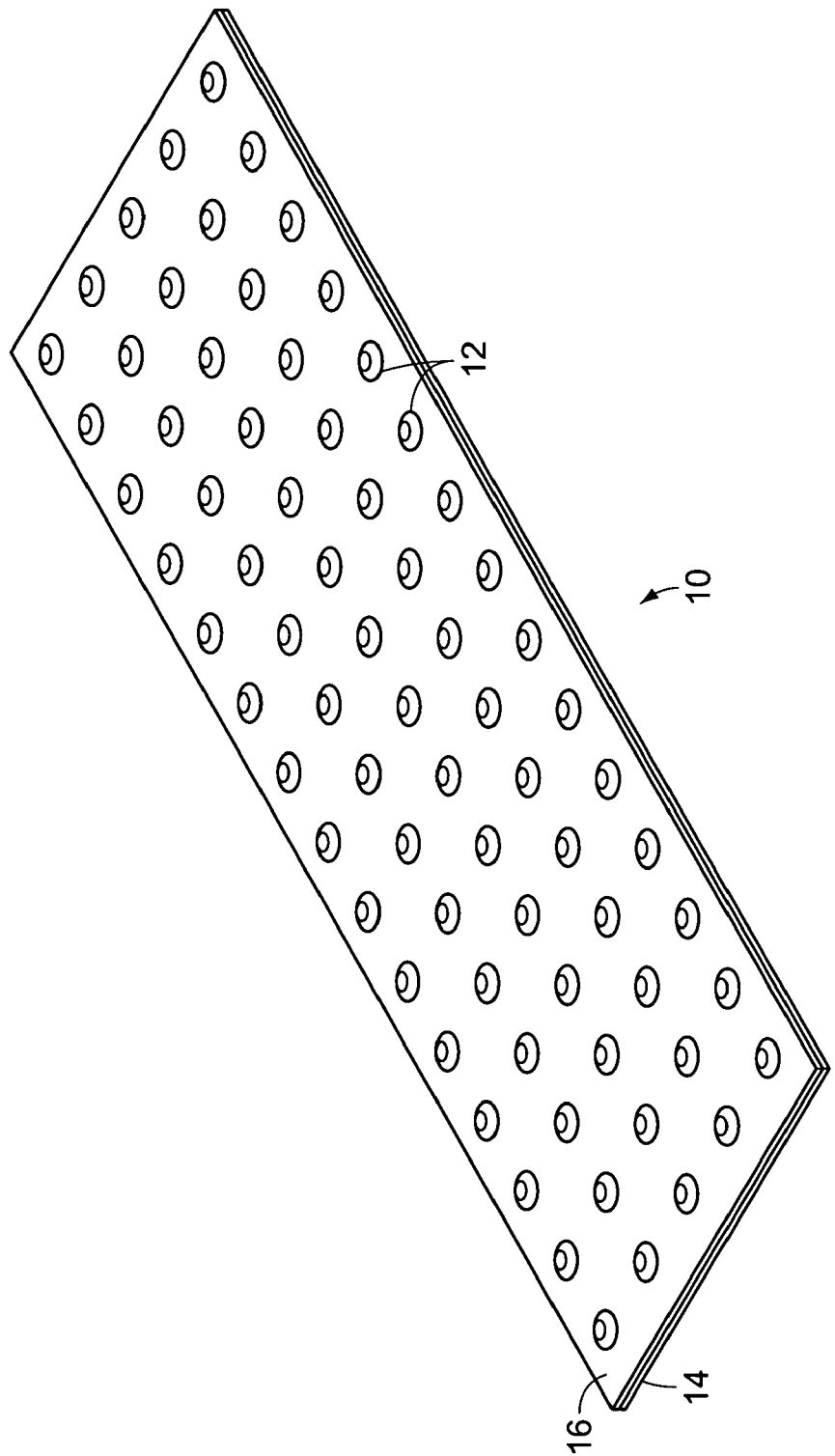
FIG. 1 is a diagrammatic perspective view illustrating a detectable warning carrier assembly, having a plurality of detectable warning domes encased between two layers of thermoplastic.

FIG. 1 illustrates a detectable warning carrier assembly 10 comprising a plurality of detectable warning domes 12 arranged in an evenly spaced, grid-like pattern, and encased between a base layer 14 and a top layer 16. The carrier assembly 10 is substantially planar in between detectable warning domes 12. The domes 12 are preferably truncated, such that they are flattened on top.

To facilitate proper application of the detectable warning carrier assembly 10, the base layer 14 and top layer 16 are preferably made of thermoplastic. The use of thermoplastic allows the base layer 14 and top layer 16 to melt so as to conform to the contours of the recipient surface, and to effectively bond with said recipient surface by flowing into cracks and pores present thereon.

Figure 2:
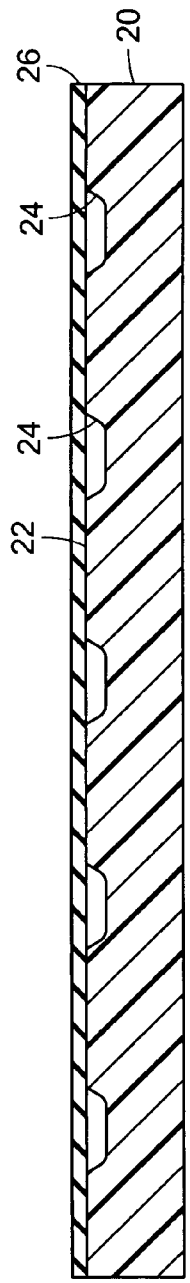
FIG. 2 is a cross sectional view of a mold used in the creation of the detectable warning carrier assembly, wherein a thermoplastic sheet has been placed to span the mold and extend across a plurality of dome forming cavities.

Referring to FIG. 2, formation of the detectable warning carrier assembly centers upon a mold 20 having a top surface 22 and a plurality of dome forming cavities 24 extending downwardly from the top surface 22. The dome forming cavities 24 are shaped like inverted truncated warning domes and are spaced apart as required by regulations such as ADAAG 4.29.2, and to otherwise function as an effective detectable warning. The dome forming cavities 24 are dimensionally modified to accommodate a coating of thermoplastic as will be apparent hereinafter.

A first sheet of thermoplastic 26 is illustrated extending across the top surface 22, spanning the mold 20, and thereby extending across all dome forming cavities 24. The first sheet of thermoplastic 26 may actually be numerous sheets of thermoplastic that are adjacent and/or overlap each other so that they together substantially span the top surface 22 of the mold 20.

Figure 3:
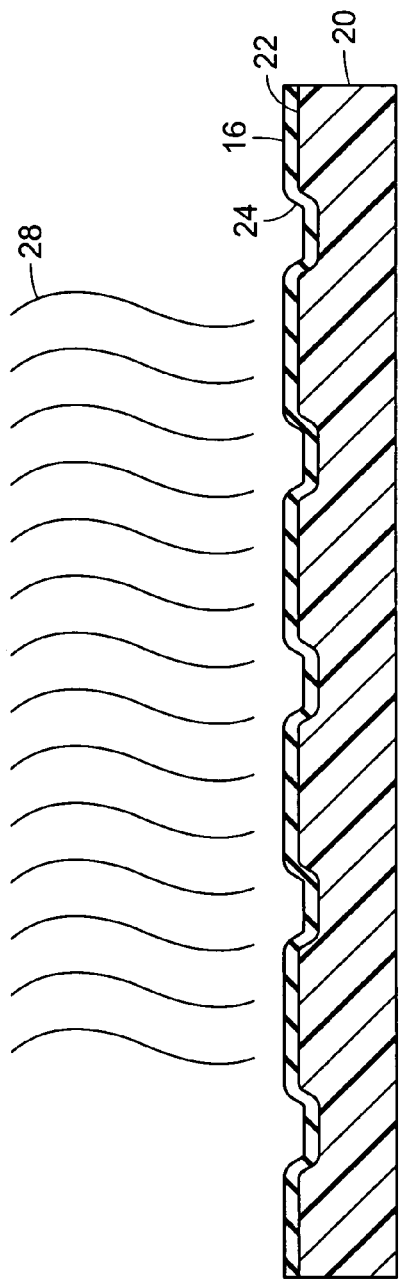
FIG. 3 is a cross sectional view similar to FIG. 2, except wherein heat is applied to melt the thermoplastic sheet so that it conforms to contours of the mold.

Referring now to FIG. 3, heat 28 is applied to the thermoplastic sheet 26 to a temperature sufficient to substantially melt the first sheet of thermoplastic, so that it forms a one-piece, continuous, top layer 16 of the detectable warning carrier assembly 10 being formed. Accordingly the top layer 16 flows into the dome forming cavities 24 where it conforms to the mold 20, taking the shape of the dome forming cavities 24, and spanning the top surface 22 with one continuous piece. The top layer 16, however, is substantially thin, and thus does not fill the dome forming cavities 24, nor does it substantially obscure the topography thereof.

Figure 4:
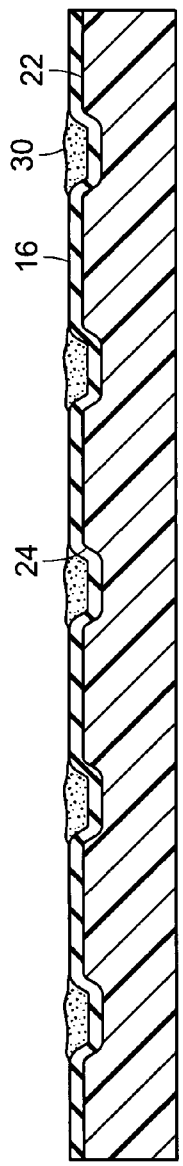
FIG. 4 is a cross sectional view, similar to FIG. 3, except wherein a heat resistant casting material has been added to the mold to form detectable warning domes within the dome forming cavities.
Figure 5:
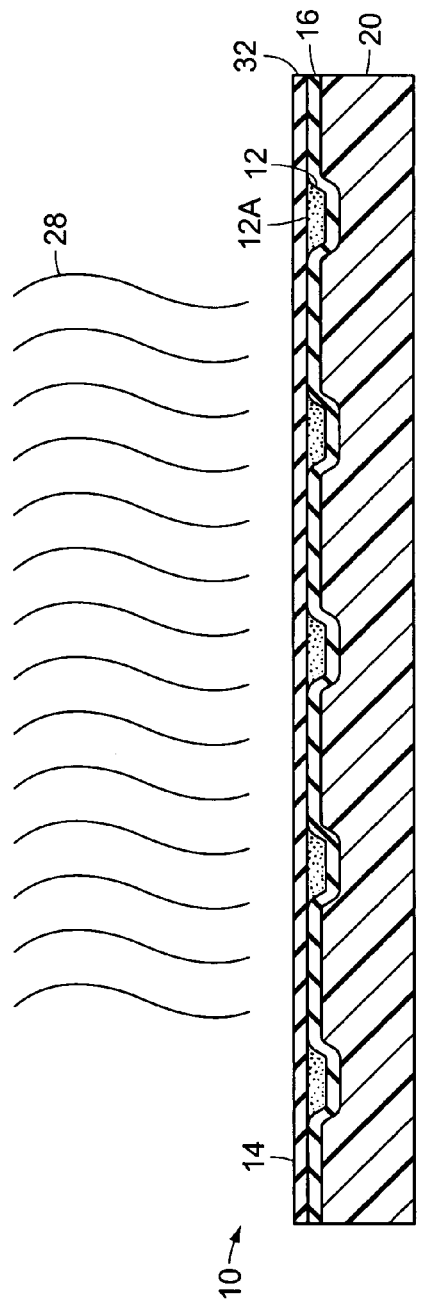
FIG. 5 is a cross sectional view, similar to FIG. 4, except wherein a second thermoplastic sheet has been extended across the dome forming cavities, spanning the mold, and heat is being applied thereto to join the second thermoplastic sheet to the existing thermoplastic to encase the detectable warning domes therebetween.

Referring now to FIG. 4, heat resistant casting material 30 has been added to substantially fill each of the dome forming cavities 24. In particular, the dome forming cavities 24 have been filed to a height substantially equivalent to the top surface 22, or more particularly—to substantially the height of the top layer 16 as it extends across the top surface 22. The heat resistant casting material is flowable but settable, hardens in time, and is preferably a masonry material such as concrete. Note that the casting material is shown as uneven at its uppermost surface—this is to emphasize its flowability and viscosity. The casting material will, however, settle and form a substantially flat dome base surface 12A, as seen in FIG. 5. Note that prior to the addition of the casting material, sand may optionally be sprinkled into the mold, while the thermoplastic is still hot, to adhere to the not-yet-cured top layer. Such sand may be added to facilitate a strong bond between the casting material and the thermoplastic top layer. Alternatively, formable heat resistant plastic, such as thermosetting plastic, may be introduced into the mold to form the domes. Once set, such plastic will resist subsequent melting, but may melt slightly on the surface sufficient to establish a strong bond between the dome and top layer 16.

If additional strength is desired, a strengthening grid, such as a mesh material, can be introduced at this point. Accordingly, such a mesh grid can be placed upon the top layer 16 so that it substantially spans the mold, and adheres to all domes. The additional strength provided by the strengthening grid helps make the invention more suitable for use on a surface where vehicles or other heavy equipment might be used.

In this regard, rather than casting the domes in place, performed domes can be introduced into the mold, with or without a pre-existing mesh grid holding a plurality of domes together. For example, the domes may be injection molded in a group, wherein members that connect the domes together are simultaneously formed during the injection molding process. The entire grouping of domes can then be placed within the dome forming cavities with the connecting members extending parallel to the top surface 22 of the mold 20. In such a case, the domes are made of a heat resistant plastic material. In addition, a plurality of domes can be joined and mounted upon a veneer of brick or other earthen material. The domes and veneer are then placed into the mold, with the domes resting against the top layer 16 within the dome forming cavities. The domes and veneer (along with adjacent veneers holding their own domes) are then encapsulated within thermoplastic material when the base layer 14 is subsequently formed.

As seen in FIG. 5, once the heat resistant casting material cures to form the detectable warning domes 12, it is covered by a second sheet of thermoplastic material 32 to coat the detectable warning domes 12 and base layer 14 with a continuous piece of thermoplastic material. In particular, the second sheet of thermoplastic material 32 spans the mold 20, covers all the detectable warning domes 12 (inverted and within the dome forming cavities), and substantially covers the top layer 16. Then, heat 28 is applied once again to bring the second sheet of thermoplastic material 32 into a melted or plastic state so that it flows to adhere to both the top layer 16 and the detectable warning domes 12. Thus, the second sheet of thermoplastic material 32 becomes the base layer 14 of the detectable warning carrier assembly 10.

Figure 6:
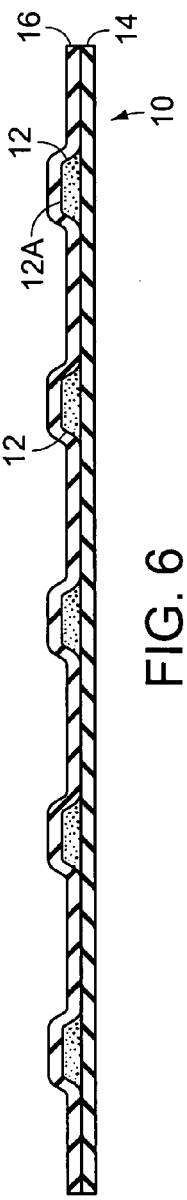
FIG. 6 is a cross sectional view of the detectable warning carrier assembly, as formed in FIGS. 2–5, removed from the mold, inverted, and ready for installation.

Referring now to FIG. 6, after cooling, the detectable warning carrier assembly 10 may be removed from the mold—by separating the top layer 16 from the mold. The carrier assembly 10 is then inverted. As illustrated, when fabricated carefully, the base layer 14 is substantially planar, and the top layer 16 is contoured to extend over the domes 12—yet remains substantially planar between domes 12. In addition, the domes 12 have a substantially flat base layer 12A. As a result, the domes 12 are sandwiched between the top layer 16 and base layer 14, and are thereby encapsulated in thermoplastic.

Figure 7:
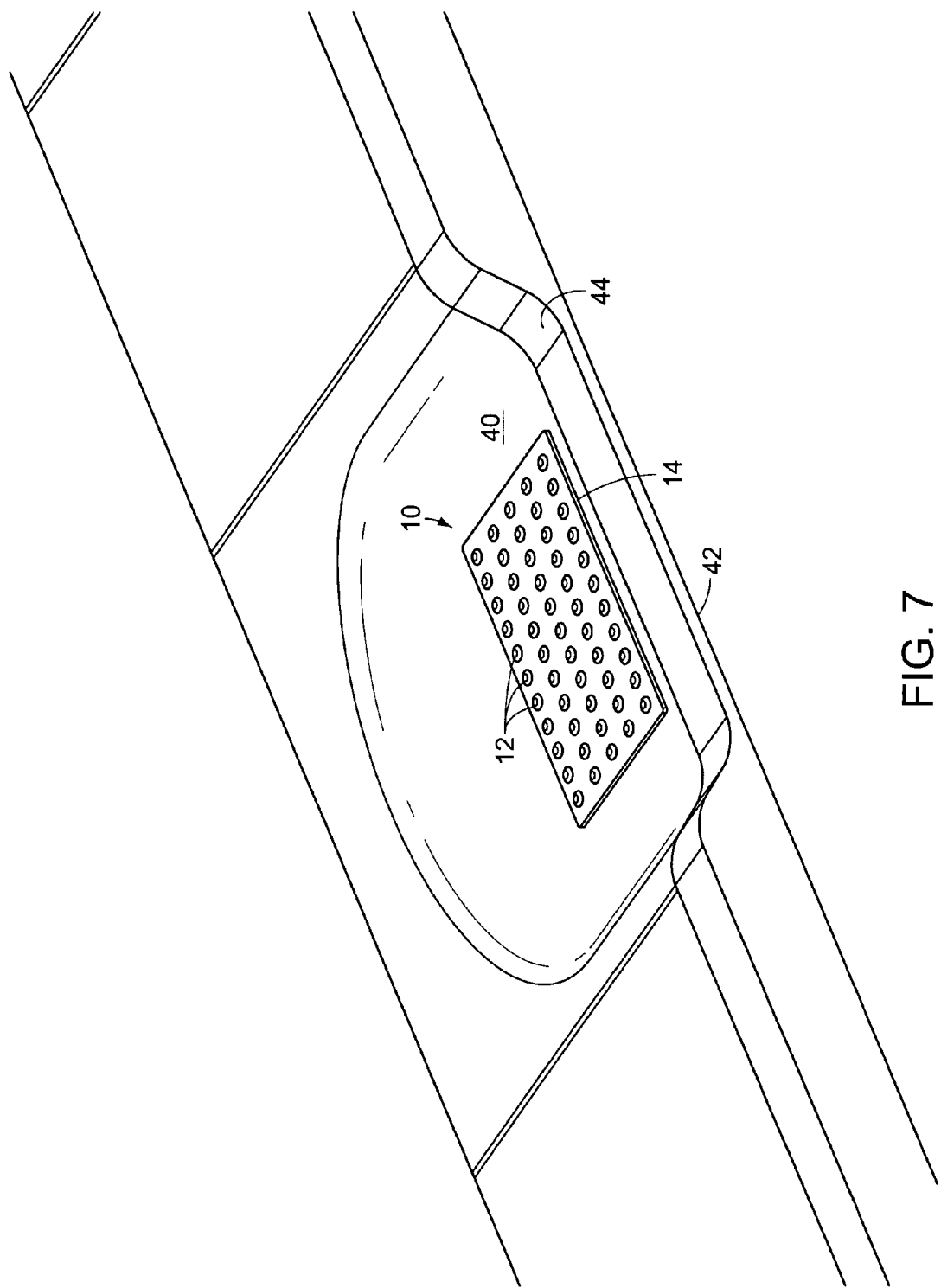
FIG. 7 is a diagrammatic perspective view, illustrating the detectable warning carrier assembly installed onto a pavement surface found at a curb cut.

Referring to FIG. 7, to install the detectable warning carrier assembly 10, the base layer 14 is placed upon a pavement surface 40 near a hazardous transition point 42. In particular, a curb cut 44 creates the transition point 42 at which it is necessary to provide a textured, tactile warning. When suitably positioned adjacent to the hazardous transition point, and trimmed to fit, heat is applied to partially melt the base layer 14. A simple torch may be used to supply the necessary heat. As the base layer 14 melts, it will flow into cracks, crevices, and pores of the pavement 40. Once it has been allowed to cool, it remains permanently attached to the pavement 40, and the domes 12 will provide tactile feedback to any pedestrian approaching the transition point 42.

In conclusion, herein is presented a detectable warning system for use on a pavement surface. The invention is illustrated by example in the drawing figures, and throughout the written description. It should be understood that numerous variations are possible, while adhering to the inventive concept. Such variations are contemplated as being a part of the present invention.

What is claimed is:

1. A detectable warning method, for providing a tactile warning upon a pavement surface, using a mold having a top surface and a plurality of dome creation cavities extending downwardly from the top surface, the dome creation cavities spaced apart from each other in a grid, comprising the steps of:
- covering the top surface of the mold with a first sheet of thermoplastic material;
- coating the top surface and the mold and the dome creation cavities with a conforming continuous top layer of thermoplastic material by applying heat to the first sheet of thermoplastic material;
- creating a plurality of detectable warning domes by filling the dome creation cavities with a heat resistant material;
- creating a detectable warning carrier assembly by coating the detectable warning domes and top layer with a base layer of thermoplastic by fully covering the base layer and detectable warning domes with a second sheet of thermoplastic material and applying heat to the second sheet of thermoplastic material; and
- applying the base layer to the pavement surface.

2. The detectable warning method as recited in claim 1, wherein the step of applying the base layer to the pavement surface is preceded by the steps of separating the top layer from the mold, and inverting the detectable warning carrier assembly; and further comprises the steps of adhering the base layer to the pavement by heating the base layer.

3. The detectable warning method as recited in claim 2, wherein the step of filling the dome creation cavities with a heat resistant material further comprises introducing into the dome creation cavities a flowable but settable, heat resistant material to substantially the level of the top surface of the mold, and allowing the heat resistant casting material to harden.

4. The detectable warning method as recited in claim 3, wherein the heat resistant material is selected from the group consisting of concrete, earthen materials, and heat resistant plastic.

5. The detectable warning method as recited in claim 4, wherein the step of applying the base layer to the pavement surface further comprises positioning the base layer adjacent to a hazardous transition.

6. The detectable warning method as recited in claim 2, wherein the step of applying the base layer to the pavement surface further comprises positioning the base layer adjacent to a hazardous transition.

* * * * *